United States Patent
Yamazaki

(10) Patent No.: US 8,488,955 B2
(45) Date of Patent: Jul. 16, 2013

(54) OPTICAL DEVICE AND CONTROL METHOD THEREFOR

(75) Inventor: Tatsuya Yamazaki, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 13/185,852

(22) Filed: Jul. 19, 2011

(65) Prior Publication Data

US 2012/0063757 A1 Mar. 15, 2012

(30) Foreign Application Priority Data

Sep. 9, 2010 (JP) ................................. 2010-202411

(51) Int. Cl.
*G03B 17/00* (2006.01)
(52) U.S. Cl.
USPC ............................................................ 396/55
(58) Field of Classification Search
USPC .............................................. 396/52, 53, 55
See application file for complete search history.

(56) References Cited

U.S. PATENT DOCUMENTS

| 2006/0206237 A1* | 9/2006 | Morisada ...................... 700/280 |
| 2006/0216010 A1* | 9/2006 | Yamanouchi et al. ........... 396/55 |
| 2008/0136926 A1* | 6/2008 | Hatanaka et al. ........ 348/208.99 |

FOREIGN PATENT DOCUMENTS

JP 2009-217075 9/2009

* cited by examiner

*Primary Examiner* — Clayton E Laballe
*Assistant Examiner* — Noam Reisner
(74) *Attorney, Agent, or Firm* — Cowan, Liebowitz & Latman, P.C.

(57) ABSTRACT

An optical device comprises a shake detection unit adapted to detect shaking of the optical device, an amplifying unit adapted to amplify a difference between an output of the shake detection unit and a reference voltage, an offset calculation unit adapted to calculate an offset component based on an output of the amplifying unit, a changing unit adapted to change the reference voltage so as to remove the offset component, a correction unit adapted to correct the output of the amplifying unit so as to cancel out a change made by the changing unit, and a focal length detection unit adapted to detect a focal length of the imaging optical system, wherein the changing unit changes the reference voltage when the offset component exceeds a threshold, and the threshold is higher when the imaging optical system is on a telephoto side than on a wide-angle side.

8 Claims, 8 Drawing Sheets

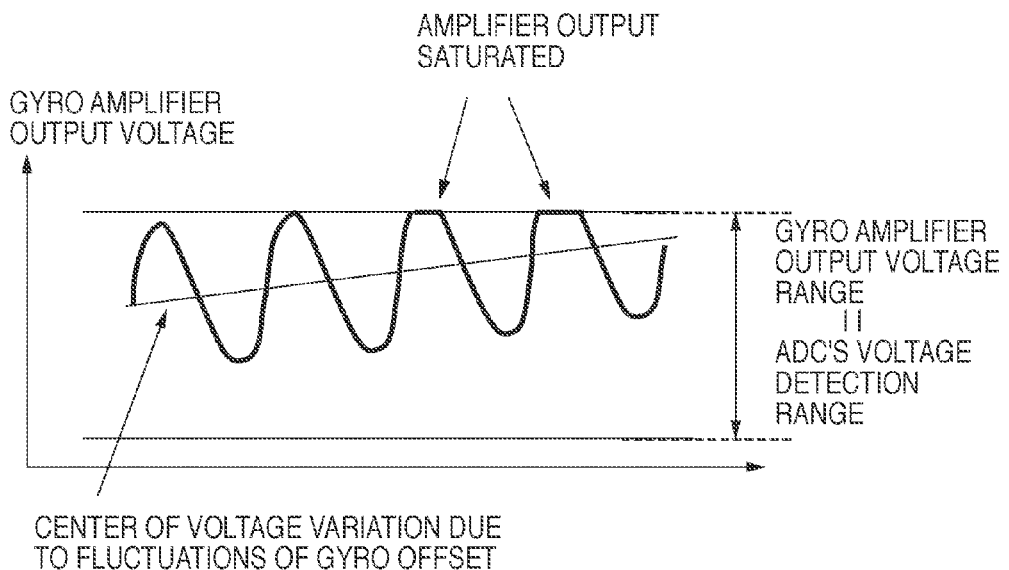
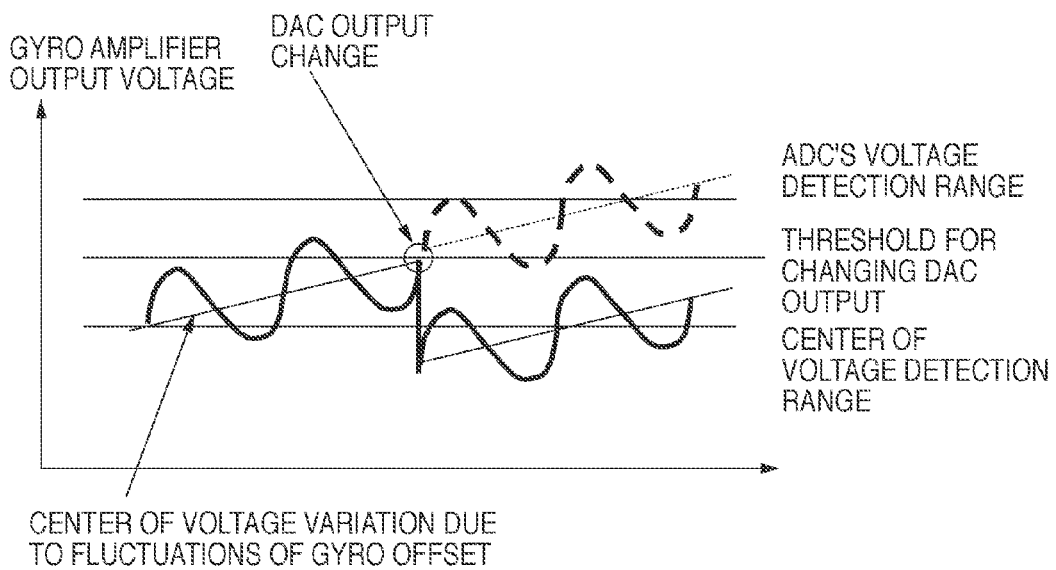

OPTICAL DEVICE AND CONTROL METHOD THEREFOR

BACKGROUND OF THE INVENTION

1. Field of the Invention

The present invention relates to an optical device provided with a function to correct blur in a captured image, a control method for the optical device, and an image capture apparatus equipped with the optical device.

2. Description of the Related Art

Shake correction devices mounted on optical devices such as lens barrels and interchangeable lenses as well as on image capture apparatus such as cameras and video cameras using the optical devices include an optical shake correction device adapted to drive some lenses (hereinafter referred to as shift lenses) in a group of image capture lenses in a direction perpendicular to an optical axis and make corrections by varying the optical axis. Such a shake correction device corrects blur in a captured image by driving the shift lenses so as to detect camera shake using an angular velocity sensor and correct the detected shake.

Examples of signal processing performed by the angular velocity sensor include a method such as is disclosed in Japanese Patent Laid-Open No. 2009-217075. The method involves amplifying an output of the angular velocity sensor using an amplifier, extracting an offset component from a signal thus obtained, changing a reference voltage of the amplifier, and thereby removing the offset component after the amplification. Variations in amplifier output caused when the reference voltage is changed is canceled out under microcomputer control in a subsequent stage.

However, with the conventional method, there arises a minute difference between a voltage generated when the reference voltage is changed and a voltage canceled out in the microcomputer. This is caused, for example, by a linear output error inherent to a D/A converter (hereinafter abbreviated to DAC) used to change the reference voltage or by resistance variation with temperature. However, such a minute difference is problematic in that it appears as image flicker on a telephoto side sensitive to correction. Thus, to reduce the flicker, it is necessary to minimize changes in the DAC output.

On the other hand, to secure a dynamic range of a signal concerning the camera shake detected by the angular velocity sensor, amplifier output in the absence of vibrations needs to be set to the center of a detectable voltage range by accurately removing offsets from the output of the angular velocity sensor. For that, it is necessary to change the reference voltage frequently.

SUMMARY OF THE INVENTION

The present invention has been made in view of the above problems and carries out signal processing for offset removal so as to make flicker inconspicuous when a reference voltage is changed and secure a necessary dynamic range.

According to a first aspect of the present invention, there is provided an optical device equipped with an imaging optical system whose focal length is variable, comprising: a shake detection unit adapted to detect shaking of the optical device; an amplifying unit adapted to amplify a difference between an output of the shake detection unit and a reference voltage; an offset calculation unit adapted to calculate an offset component based on an output of the amplifying unit; a changing unit adapted to change the reference voltage so as to remove the offset component; a correction unit adapted to correct the output of the amplifying unit so as to cancel out a change made by the changing unit; and a focal length detection unit adapted to detect a focal length of the imaging optical system, wherein the changing unit changes the reference voltage when the offset component exceeds a threshold, and the threshold is higher when the imaging optical system is on a telephoto side than on a wide-angle side.

According to a second aspect of the present invention, there is provided an optical device equipped with an imaging optical system whose focal length is variable, comprising: a shake detection unit adapted to detect shaking of the optical device; an amplifying unit adapted to amplify a difference between an output of the shake detection unit and a reference voltage; an offset calculation unit adapted to calculate an offset component based on an output of the amplifying unit; a changing unit adapted to change the reference voltage so as to remove the offset component; a correction unit adapted to correct the output of the amplifying unit so as to cancel out a change made by the changing unit; and a focal length detection unit adapted to detect a focal length of the imaging optical system, wherein the changing unit performs a changing operation more frequently when the imaging optical system is on the wide-angle side than on the telephoto side.

According to a third aspect of the present invention, there is provided an optical device equipped with an imaging optical system whose focal length is variable, comprising: a shake detection unit adapted to detect shaking of the optical device; a correction member adapted to correct image blur caused by the shaking of the optical device; an amplifying unit adapted to amplify a difference between an output of the shake detection unit and a reference voltage; an offset calculation unit adapted to calculate an offset component based on an output of the amplifying unit; a changing unit adapted to change the reference voltage so as to remove the offset component; a correction unit adapted to correct the output of the amplifying unit so as to cancel out a change made by the changing unit; and a correction range detection unit adapted to detect a correctable range of the correction member, wherein the changing unit changes the reference voltage when the offset component exceeds a threshold, and the threshold is changed according to the correctable range.

According to a fourth aspect of the present invention, there is provided a control method for an optical device equipped with an imaging optical system whose focal length is variable, the control method comprising: a shake detection step of detecting shaking of the optical device; an amplification step of amplifying a difference between an output of the shake detection step and a reference voltage; an offset calculation step of calculating an offset component based on an output of the amplification step; a changing step of changing the reference voltage so as to remove the offset component; a correction step of correcting the output of the amplification step so as to cancel out a change made by the changing step; and a focal length detection step of detecting a focal length of the imaging optical system, wherein the changing step changes the reference voltage when the offset component exceeds a threshold, and the threshold is higher when the imaging optical system is on a telephoto side than on a wide-angle side.

According to a fifth aspect of the present invention, there is provided a control method for an optical device equipped with an imaging optical system whose focal length is variable, the control method comprising: a shake detection step of detecting shaking of the optical device; an amplification step of amplifying a difference between an output of the shake detection step and a reference voltage; an offset calculation step of calculating an offset component based on an output of the amplification step; a changing step of changing the reference voltage so as to remove the offset component; a correction step of correcting the output of the amplification step so as to cancel out a change made by the changing step; and a focal length detection step of detecting a focal length of the imaging optical system, wherein the changing step performs a changing operation more frequently when imaging optical system is on the wide-angle side than on the telephoto side.

According to a sixth aspect of the present invention, there is provided a control method for an optical device equipped with an imaging optical system whose focal length is variable, the control method comprising: a shake detection step of detecting shaking of the optical device; a correction step of correcting image blur caused by the shaking of the optical device using a correction member; an amplification step of amplifying a difference between an output of the shake detection step and a reference voltage; an offset calculation step of calculating an offset component based on an output of the amplification step; a changing step of changing the reference voltage so as to remove the offset component; a correction step of correcting the output of the amplification step so as to cancel out a change made by the changing step; and a correction range detection step of detecting a correctable range of the correction member, wherein the changing step changes the reference voltage when the offset component exceeds a threshold, and the threshold is changed according to the correctable range.

Further features of the present invention will become apparent from the following description of exemplary embodiments with reference to the attached drawings.

BRIEF DESCRIPTION OF THE DRAWINGS

FIGS. 2A and 2B are diagrams showing an impact of changes in DAC output on amplifier output;

DESCRIPTION OF THE EMBODIMENTS

First Embodiment

A first embodiment of the present invention relates to a method for reducing image flicker due to changes in a reference voltage (described in SUMMARY OF THE INVENTION) by changing a reference voltage changing method according to focal length.

Figure 1:
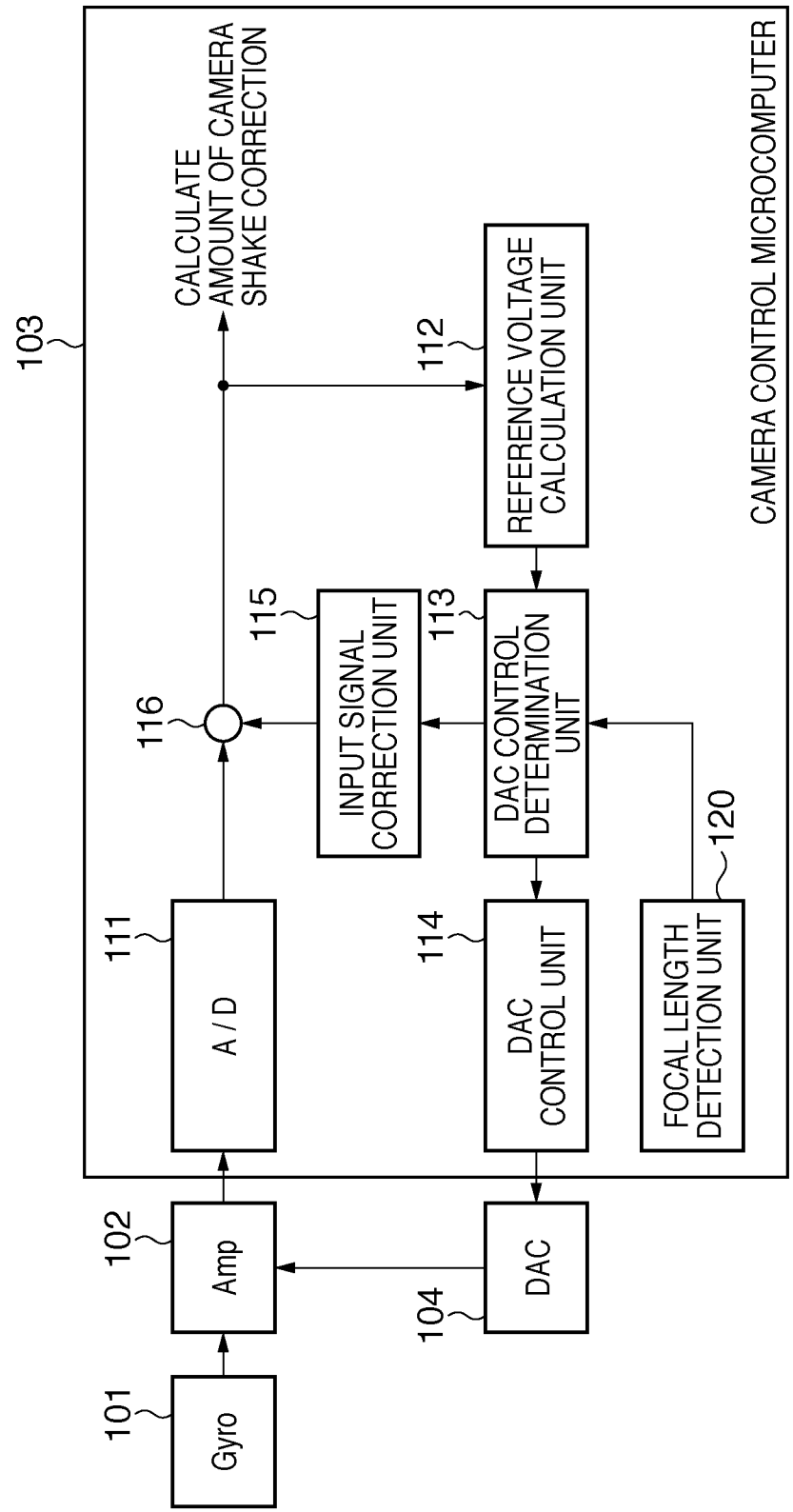
FIG. 1 is a block diagram showing a configuration of a camera shake detection unit and offset removal unit in an optical device according to a first embodiment of the present invention.

FIG. 1 is a block diagram showing a configuration of a camera shake detection unit and offset removal unit in an optical device according to a first embodiment of the present invention or in a digital video camera which is an image capture apparatus equipped with the optical device. In FIG. 1, reference numeral 101 denotes an angular velocity sensor (hereinafter referred to as a gyro) adapted to detect camera shake, 102 denotes an amplifier adapted to amplify gyro output. The amplifier 102 amplifies a difference between an output of the gyro 101 and a reference voltage. Reference numeral 103 denotes a camera control microcomputer (hereinafter referred to as a microcomputer) adapted to control the entire digital video camera. Specifically, the microcomputer 103 controls image blur correction operation, AF (autofocus) operation, zoom operation, AE (auto exposure) control operation, and the like. However, for the sake of simplicity, only a group of components necessary for description of the present embodiment, i.e., a shake correction control block, is illustrated herein. Reference numeral 104 denotes a D/A converter (hereinafter abbreviated to DAC) used to change the reference voltage of the amplifier 102.

Although not illustrated in FIG. 1, the digital video camera according to the present embodiment includes image capture lenses whose focal length is variable and an optical shake correction unit installed in the image capture lens and adapted to make shake corrections (image blur corrections) by varying an optical axis by driving some of lenses (hereinafter referred to as shift lenses) in a direction perpendicular to the optical axis. Furthermore, the digital video camera includes a correction range detection unit adapted to detect a correction range of the optical shake correction unit.

Reference numeral 111 denotes an A/D converter (hereinafter abbreviated to ADC) incorporated in the microcomputer 103 and adapted to read an output signal of the amplifier 102. Reference numeral 112 denotes a reference voltage calculation unit (offset voltage calculation unit) adapted to calculate a reference voltage corresponding to an amplifier (102) output when the optical device is not operating, based on a signal inputted in the ADC 111. Reference numeral 113 denotes a DAC control determination unit (change determination unit) adapted to determine whether to control the DAC 104, based on an output of the reference voltage calculation unit 112. Reference numeral 114 denotes a DAC control unit (capable of changing the reference voltage) adapted to control DAC (104) output, based on results produced by the DAC control determination unit 113. Reference numeral 115 denotes an input signal correction unit (fluctuation calculation unit) adapted to calculate an amount to be canceled out, in sync with the DAC (104) control performed by the DAC control unit 114, where the amount to be canceled out corresponds to an amount of fluctuations in the amplifier (102) output caused by DAC (104) control.

Reference numeral 116 denotes an adder adapted to add an amount of offset cancellation calculated by the input signal correction unit 115 to an ADC (111) input.

FIGS. 2A and 2B are diagrams schematically showing an amplifier (102) output when a gyro offset fluctuates during hand-held photography. FIG. 2A shows variations in amplifier output when offset correction is not performed by the DAC and FIG. 2B shows variations in amplifier output when offset correction is performed.

As can be seen from FIGS. 2A and 2B, the amplifier output is saturated by offset fluctuations if offset correction is not performed. Therefore, if it is likely that the amplifier (102) output will exceed a detection range of the ADC 111, the reference voltage is varied by the DAC 104 to set the amplifier (102) output approximately at the center of a voltage detection range of the ADC 111. To cancel out voltage fluctuations which occur as a result, the input signal correction unit 115 and adder 116 are required.

An amount of camera shake correction is calculated based on an adder (116) output produced by cancelling out the voltage fluctuations. Then, depending on results of the calculation, a camera shake correction unit (not shown) comes into operation and makes a camera shake correction.

Reference numeral 120 denotes a focal length detection unit adapted to detect the current focal length according to operation of a focal length changing unit (not shown).

Figure 3:
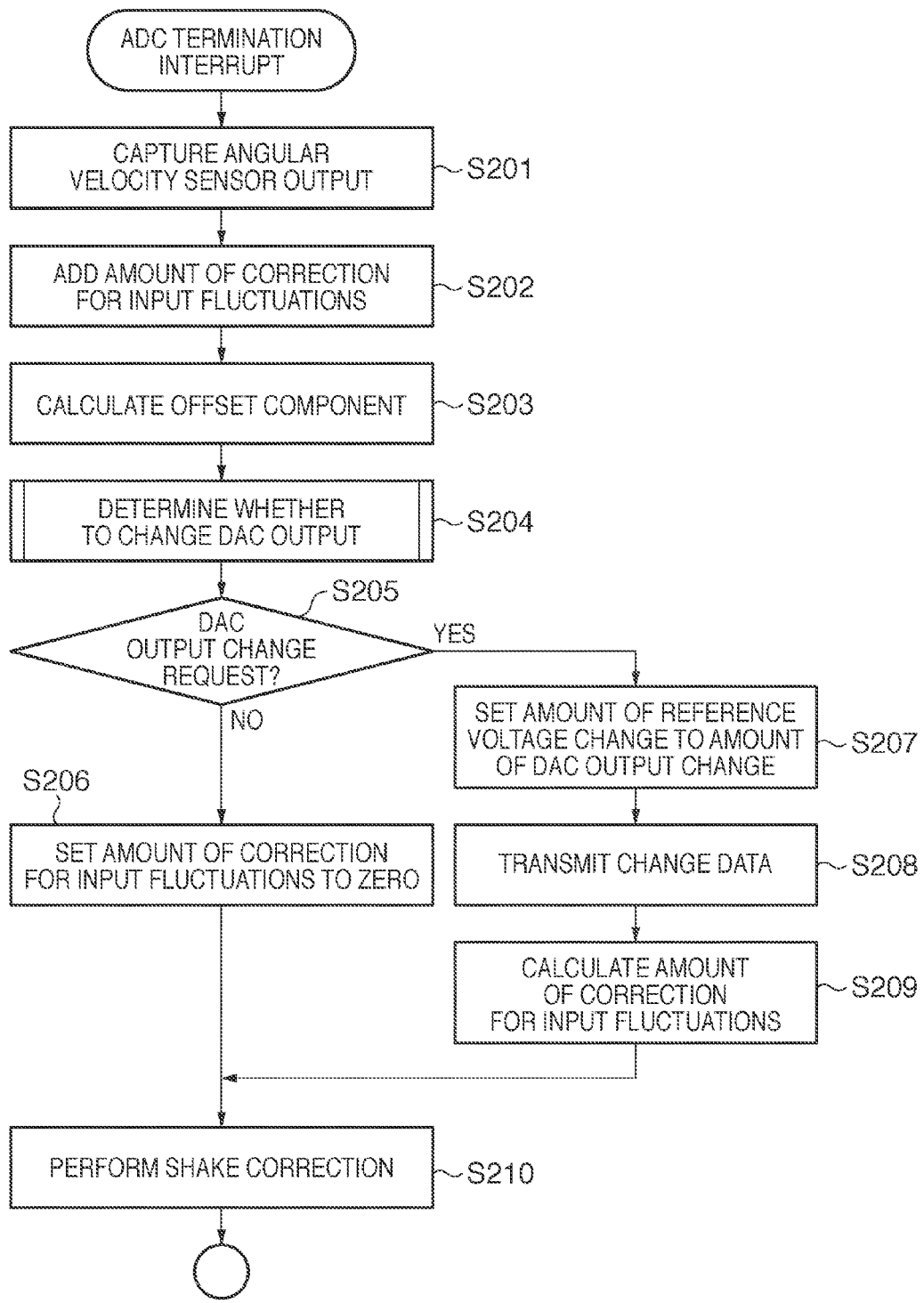
FIG. 3 is a flowchart of internal operations of a microcomputer according to the first embodiment of the present invention.
Figure 4:
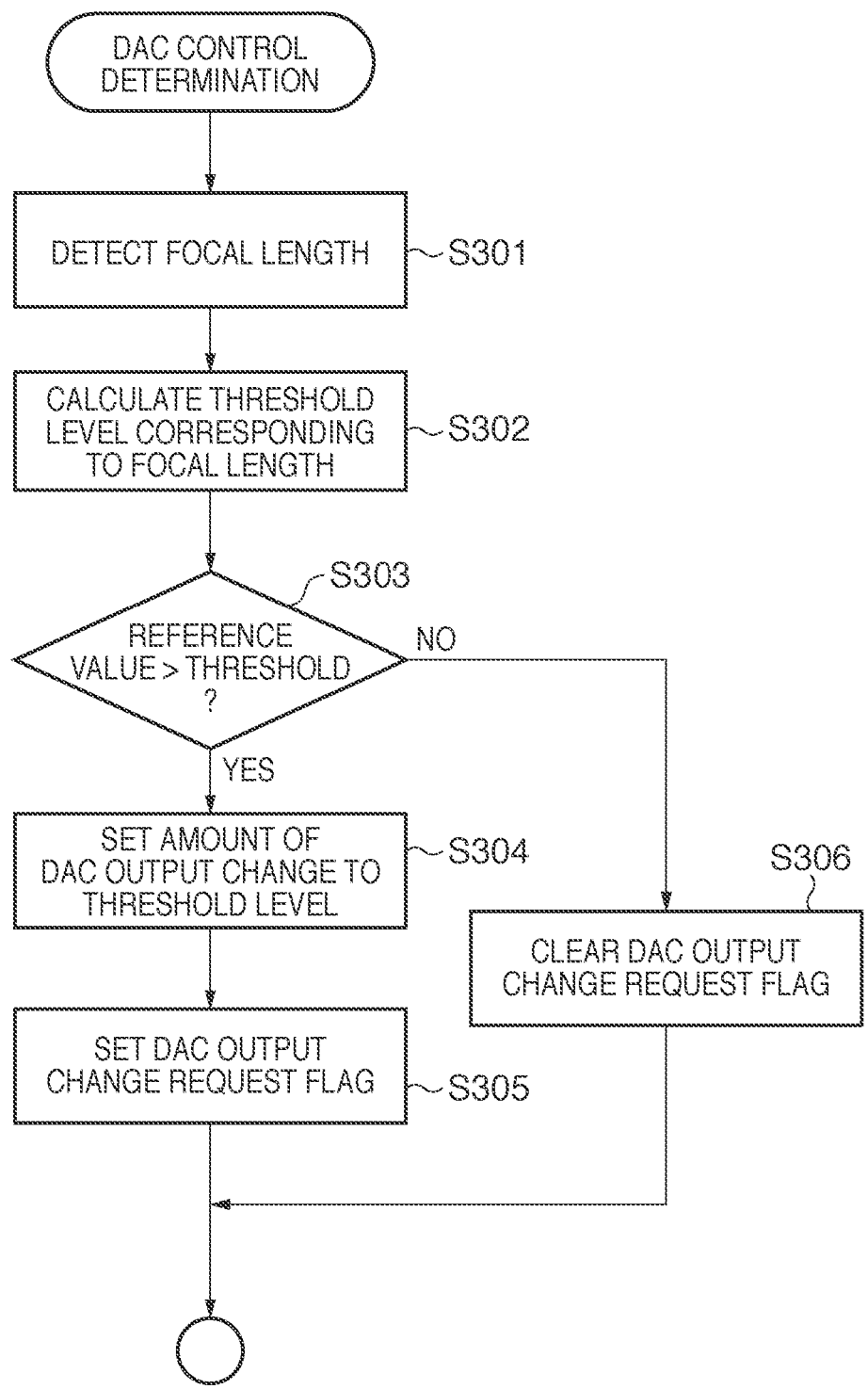
FIG. 4 is a flowchart of a DAC control determination unit.

FIG. 3 is a flowchart showing gyro offset correction control performed by the microcomputer 103 according to the first embodiment of the present invention. FIG. 4 is a flowchart of a characteristic part of the present embodiment, i.e., a part concerned with determining whether to change DAC (104) output. Now, operation of the first embodiment will be described in detail with reference to FIGS. 3 and 4.

The control shown in FIG. 3 is initiated by an A/D conversion termination interrupt on the microcomputer 103. In S201, an angular velocity sensor output subjected to A/D conversion is captured as angular velocity data. In S202, an amount of correction for input fluctuations is added to the angular velocity data. Consequently, fluctuations in amplifier (102) output caused by fluctuations in DAC (104) output is canceled out. Next, in S203, an offset component is calculated from the signal in which the output fluctuations have been canceled out. In S204, it is determined whether to change the DAC output.

FIG. 4 is a flowchart of the D/A converter control determination unit, which is a characteristic part of the present embodiment. In FIG. 4, the current focal length is detected by the focal length detection unit 120 in S301 and a threshold level corresponding to the detected focal length is calculated in S302. During operation of the shake correction unit, flicker caused by fluctuations is inconspicuous on a wide-angle side due to low sensitivity, and conspicuous on a telephoto side due to high sensitivity. On the other hand, an angular range to be detected is wide on the wide-angle side, and narrow on the telephoto side. Therefore, the threshold level is set to be narrow on the wide-angle side on which the focal length is short, and wide on the telephoto side on which the focal length is long, widest on the telephoto end.

In S303 of FIG. 4, it is determined whether the offset exceeds a predetermined threshold. If the threshold is exceeded, an amount of change in the DAC (104) output is set to the threshold level in S304 and a DAC output change request flag is set in S305. If it is found in S304 that the offset does not exceed the threshold, the DAC output change request flag is cleared in S306. The above is operation of the DAC control determination unit.

Figure 5:
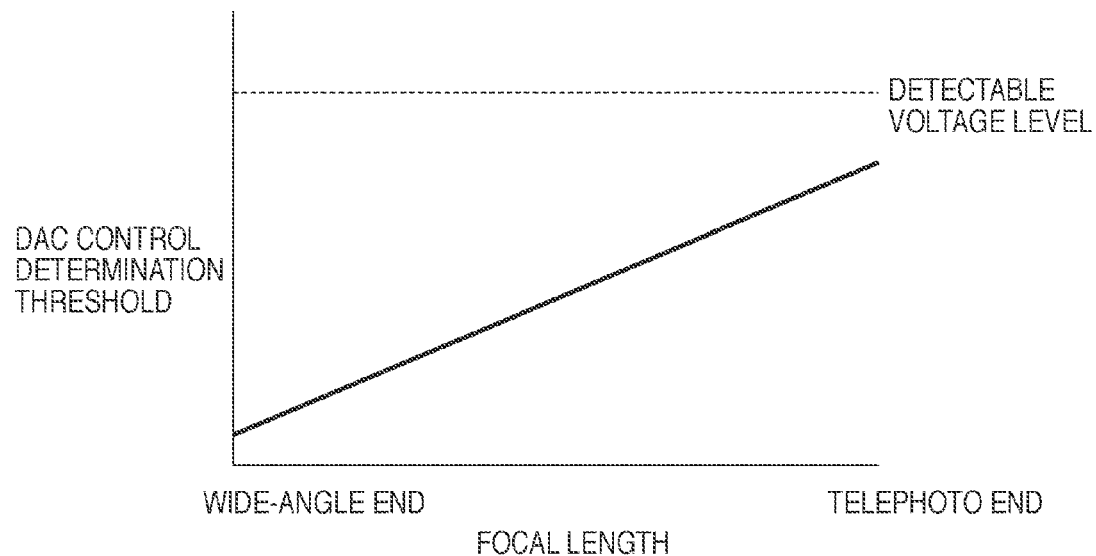
FIG. 5 is a diagram showing a threshold for changing a DAC output voltage according to focal length.
Figure 6:
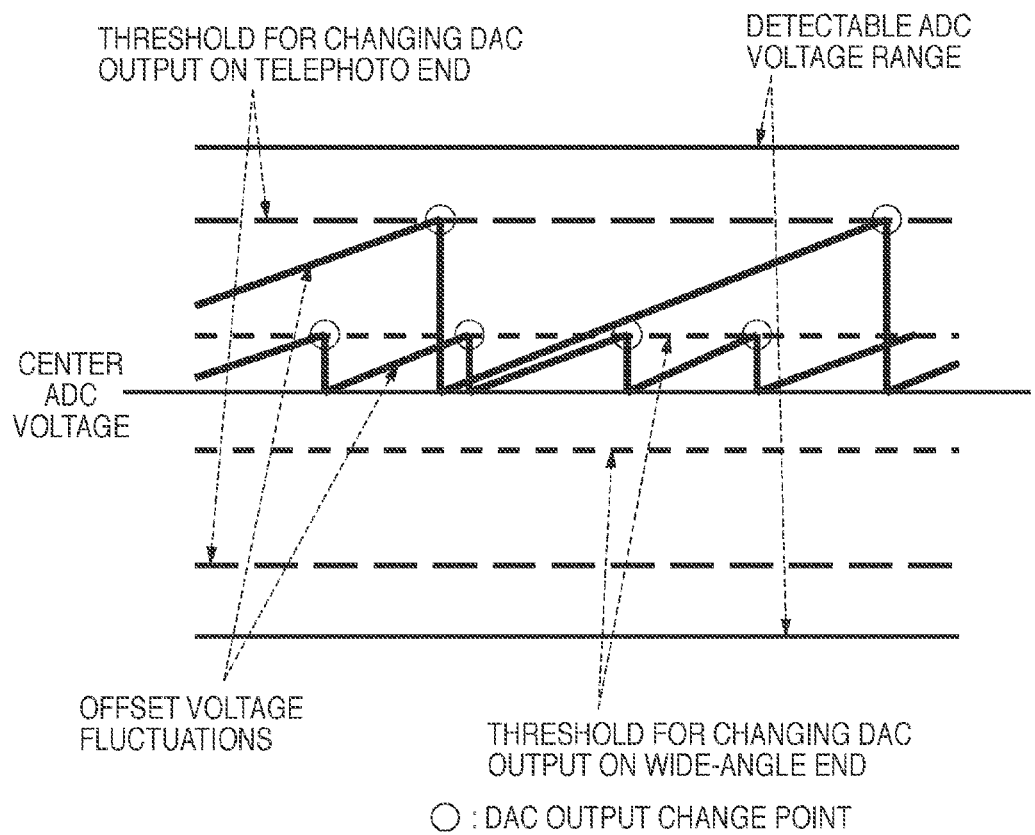
FIG. 6 is a diagram showing a relationship of offset voltage fluctuations to the threshold for changing the DAC output and frequency of output changes.

FIG. 5 shows threshold levels set for different focal lengths. As described above, since a correctable angle on the telephoto side is narrow, a detected voltage amplitude needed for camera shake correction is narrow. Therefore, even if output voltage is adjusted roughly by the DAC 104, necessary output fluctuations can be obtained satisfactorily. On the wide-angle side, since the angle to be detected widens such as in the case of shooting while walking, it is necessary to adjust a center level of the output voltage frequently in order to secure a dynamic range. The control shown in FIG. 4 causes a DAC control determination threshold to be changed as shown in FIG. 5, and consequently, timings for changing a reference level on a wide-angle end and telephoto end are as shown in FIG. 6. That is, level adjustments can be made frequently on the wide-angle side, securing the dynamic range while the frequency of reference voltage changes can be reduced on the telephoto side, reducing the frequency of flicker.

Returning to FIG. 3, based on the DAC output change request flag set in S305 or S306 of FIG. 4, it is determined in S205 whether there is a change request. If there is no change request, the amount of correction for input fluctuations is set to 0 (zero) in S206. If there is a change request, the amount of DAC output change which has been set in S304 of FIG. 4 is set as an amount of reference voltage change in S207 and change data is transmitted serially to the DAC 104 in S208. Consequently, the DAC 104 changes its output as required. Next, the amount of correction is calculated in S209 to make a correction for an amount of input fluctuations resulting from the current DAC output change, and a normal shake correction process is performed in S210.

As described above, by changing the threshold for reference voltage change (changing a determination method) according to the focal length, it is possible to secure the dynamic range on the wide-angle side and alleviate trouble caused by flicker on the telephoto side.

Second Embodiment

A second embodiment relates to a method for reducing image flicker due to changes in the reference voltage (described in SUMMARY OF THE INVENTION) by changing the threshold for changing the DAC output according to a correctable range of the shake correction unit.

Figure 7:
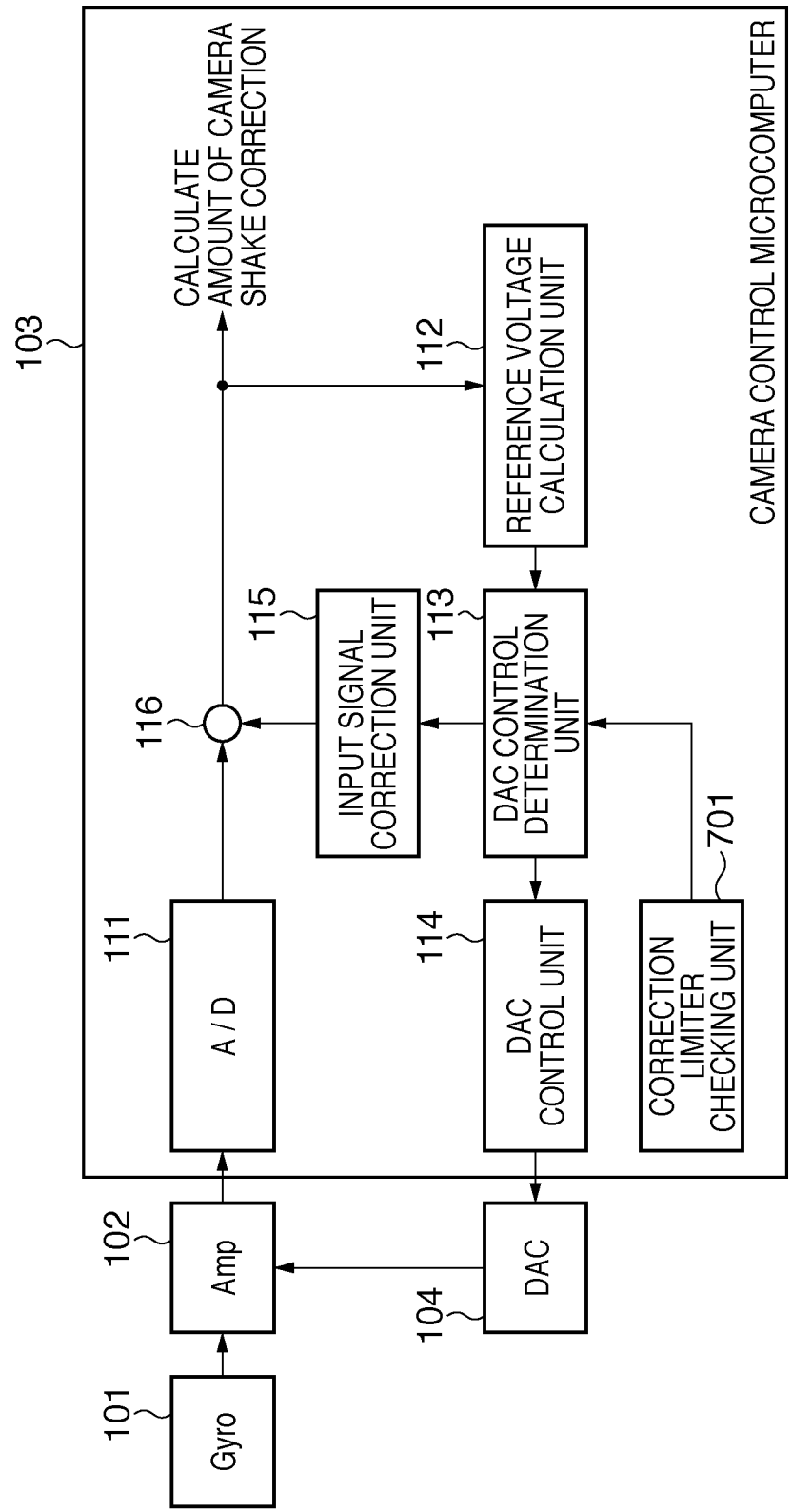
FIG. 7 is a block diagram showing a configuration of a camera shake detection unit and offset removal unit in an optical device according to a second embodiment of the present invention.

FIG. 7 is a block diagram showing a configuration of the second embodiment. In FIG. 7, the same components as those in FIG. 1 are denoted by the same reference numerals as the corresponding components, and description thereof will be omitted. The configuration in FIG. 7 differs from FIG. 1 only in a correction limiter checking unit 701. The correction limiter here is a maximum correction angle at which the shake correction unit (not shown) can make corrections. The correction limiter varies with the ambient temperature, f-stop number, and the like even if the focal length is the same, but when set to a large value, the correction limiter needs a dynamic range in order to improve shake correction performance. Conversely, when the correction limiter is set to a small value, there is not much need for a dynamic range. That is, the correction limiter causes the timing for changing the reference voltage to be varied.

Figure 8:
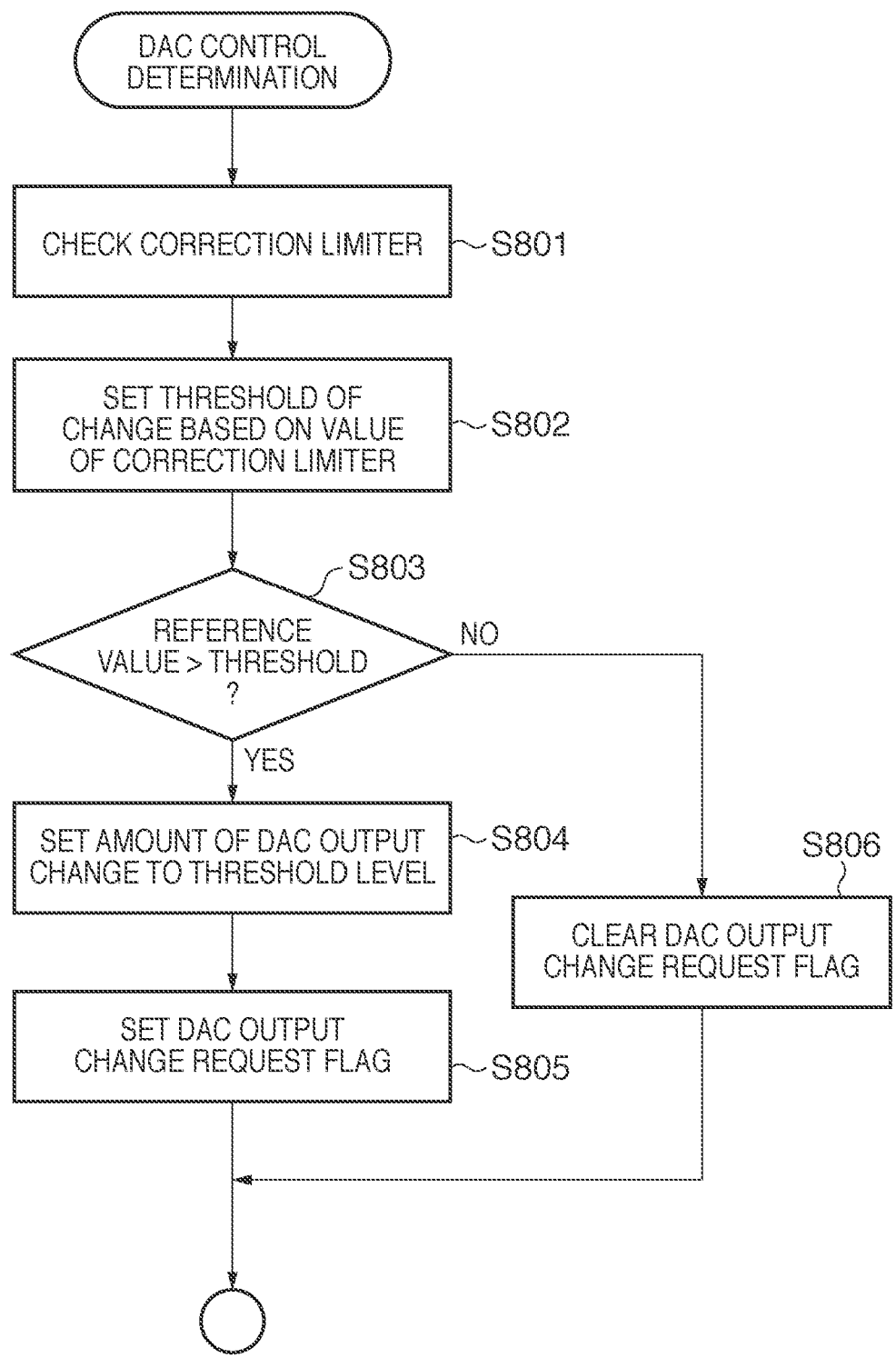
FIG. 8 is a flowchart of a control determination unit according to the second embodiment of the present invention.

FIG. 8 is a flowchart of a part concerned with determining whether to change DAC (104) output in the second embodiment. FIG. 8 differs from FIG. 2 only in steps S801 and S802, and description of other steps will be omitted.

In FIG. 8, the correction limiter is checked in S801. Then, based on the value of the checked correction limiter, a change threshold is set in S802. Subsequently, as in the case of the first embodiment, the DAC output is changed based on an amount of offset and a value of the set threshold.

Figure 9:
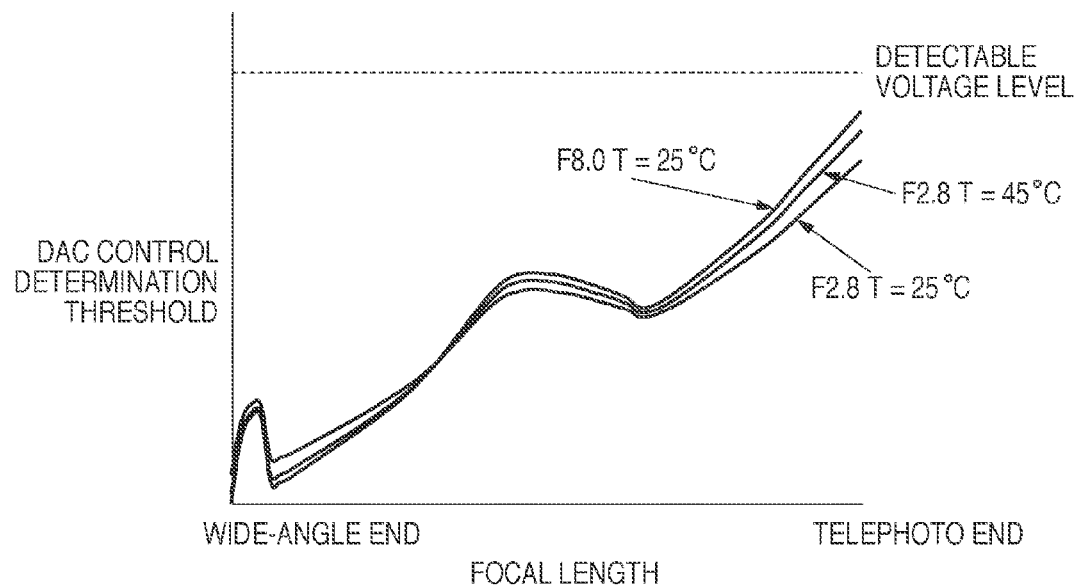
FIG. 9 is a diagram showing a relationship between a correction range and a threshold for changing DAC.

FIG. 9 shows an example of change threshold settings. Since a correctable range is set by taking black corners into consideration based on the ambient temperature, f-stop number, and the like, a few settings are made for the same focal length as shown in FIG. 9.

In this way, since the DAC output is changed based on a necessary dynamic range as the change threshold is set according to the correctable range, the frequency of DAC output changes can be reduced not only on the telephoto side, but also in a wide- to middle-angle region, further reducing image flicker due to DAC output changes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-202411, filed Sep. 9, 2010, which is hereby incorporated by reference herein in its entirety.

What is claimed is:

1. An optical device equipped with an imaging optical system whose focal length is variable, comprising:
    a shake detection unit adapted to detect shaking of the optical device;
    an amplifying unit adapted to amplify a difference between an output of said shake detection unit and a reference voltage;
    an offset calculation unit adapted to calculate an offset component based on an output of said amplifying unit;
    a changing unit adapted to change the reference voltage so as to remove the offset component when the offset component exceeds a threshold;
    a correction unit adapted to correct the output of said amplifying unit so as to cancel out a change made by said changing unit; and
    a focal length detection unit adapted to detect a focal length of the imaging optical system, wherein the threshold is higher when the imaging optical system is on a telephoto side than on a wide-angle side.

2. The optical device according to claim 1, wherein said changing unit increases the threshold with increases in the focal length detected by said focal length detection unit.

3. An image capture apparatus equipped with the optical device according to claim 1.

4. An optical device equipped with an imaging optical system whose focal length is variable, comprising:
    a shake detection unit adapted to detect shaking of the optical device;
    a correction member adapted to correct image blur caused by the shaking of the optical device;
    an amplifying unit adapted to amplify a difference between an output of said shake detection unit and a reference voltage;
    an offset calculation unit adapted to calculate an offset component based on an output of said amplifying unit;
    a changing unit adapted to change the reference voltage so as to remove the offset component when the offset component exceeds a threshold;
    a correction unit adapted to correct the output of said amplifying unit so as to cancel out a change made by said changing unit; and
    a correction range detection unit adapted to detect a correctable range of said correction member,
    wherein the threshold becomes higher when the correctable range of said correction member increases.

5. The optical device according to claim 4, wherein said changing unit changes the threshold to a large value when the correctable range detected by said correction range detection unit is narrow, and changes the threshold to a small value when the correctable range is wide.

6. An image capture apparatus equipped with the optical device according to claim 4.

7. A control method for an optical device equipped with an imaging optical system whose focal length is variable, the control method comprising:
    a shake detection step of detecting shaking of the optical device;
    an amplification step of amplifying a difference between an output of said shake detection step and a reference voltage;
    an offset calculation step of calculating an offset component based on an output of said amplification step;
    a changing step of changing the reference voltage so as to remove the offset component when the offset component exceeds a threshold;
    a correction step of correcting the output of said amplification step so as to cancel out a change made by said changing step; and
    a focal length detection step of detecting a focal length of the imaging optical system, and
    the threshold is higher when the imaging optical system is on a telephoto side than on a wide-angle side.

8. A control method for an optical device equipped with an imaging optical system whose focal length is variable, the control method comprising:
    a shake detection step of detecting shaking of the optical device;
    a correction step of correcting image blur caused by the shaking of the optical device using a correction member;
    an amplification step of amplifying a difference between an output of said shake detection step and a reference voltage;
    an offset calculation step of calculating an offset component based on an output of said amplification step;
    a changing step of changing the reference voltage so as to remove the offset component when the offset component exceeds a threshold;
    a correction step of correcting the output of said amplification step so as to cancel out a change made by said changing step; and
    a correction range detection step of detecting a correctable range of said correction member,
    wherein the threshold becomes higher when the correctable range of said correction member increases.

* * * * *